United States Patent [19]

Kobori et al.

[11] 4,268,873
[45] May 19, 1981

[54] SERVO CIRCUIT FOR ROTARY HEADS OF A VIDEO TAPE RECORDER

[75] Inventors: Yasunori Kobori; Toshi Itoh, both of Katsuta; Yoichi Tokunaga, Mito; Tunehiko Teshima, Katsuta, all of Japan

[73] Assignee: Hitachi, Ltd., Tokyo, Japan

[21] Appl. No.: 63,711

[22] Filed: Aug. 6, 1979

[30] Foreign Application Priority Data

Aug. 9, 1978 [JP] Japan ............................... 53-96220

[51] Int. Cl.³ .......................................... H04N 5/785
[52] U.S. Cl. ........................................ 360/9; 360/21; 360/70
[58] Field of Search ..................... 360/9–10, 360/21, 33, 70, 75; 358/127, 4, 8

[56] References Cited

U.S. PATENT DOCUMENTS

| | | | |
|---|---|---|---|
| 4,007,484 | 2/1977 | Amaki | 358/8 |
| 4,040,101 | 8/1977 | Zoellner et al. | 360/10 |
| 4,131,912 | 12/1978 | Hirai | 358/4 |
| 4,180,833 | 12/1979 | Nishikawa et al. | 360/21 |
| 4,184,181 | 1/1980 | Misatovic | 360/70 |

Primary Examiner—Raymond F. Cardillo, Jr.
Attorney, Agent, or Firm—Craig & Antonelli

[57] ABSTRACT

A servo circuit is disclosed for a video tape recorder of helical scan type having two rotary heads, in which recording/reproduction is capable of being performed at different tape feed rates, and a recording track for the video signal is formed partially superimposed on the previously-formed recording track, thus forming a recording track narrower than the heads when the tape feed rate is low. A control pulse which is in phase with the vertical synchronizing signal extracted from the video signal to be recorded is recorded in the control track, and the rotational phase of the rotary heads is controlled by use of the control pulse read at the time of reproduction. The servo circuit causes a shift in the phase of the control pulses and a change in the phase of the control pulses before recording when the tape feed rate is low.

5 Claims, 6 Drawing Figures

SERVO CIRCUIT FOR ROTARY HEADS OF A VIDEO TAPE RECORDER

BACKGROUND OF THE INVENTION

The present invention relates to a servo circuit for rotary heads of a video tape recorder, or more particularly to a servo circuit of the rotary heads of the video tape recorder in which recording/reproduction is capable of being performed at two or more different tape speeds.

There is such a demand for a general video tape recorder for home use that recording/reproduction time should be switched between two or more different times by using a tape of the same length. In a video tape recorder meeting such a requirement, the tape feed rate is capable of being switched. Examples of the locus of the signal recorded on the tape by such a video tape recorder are illustratively shown in FIGS. 1 and 2. These are in connection with a two-head helical scan type of video tape recorder with FIG. 1 showing the condition of standard play, i.e. normal speed play. In the drawing, reference numeral 1 shows a head for channel 1, and numeral 3 a head for channel 2. The recording signals are recorded on the tape by alternately using the two heads 1 and 3. The arrows in FIGS. 1 and 2 show the running direction of the tape T, and the recording tracks 2a, 2b, 2c and so on are formed by the head 1, while the recording tracks 4a, 4b, 4c and so on are formed by the head 3. In order to increase the recording density, there is no guard band formed between the adjacent recording tracks and so adjacent tracks are arranged closely to each other. Reference character C shows a control track formed in the longitudinal direction of the tape, in which control pulses 9s are recorded in a predetermined relation with the recording tracks to enable the heads 1 and 3 to accurately trace the recording tracks 2a and 4a and so on at the time of reproduction.

The diagram of FIG. 2 shows a case of long play in which recording/reproduction is performed for twice the length of time and at one half the tape feed rate of FIG. 1 using the same tape. In the long play condition, tape feed speed is lower than in standard play and therefore the track recorded by the head 1 is partially rewritten by the head 3, thus forming a narrower track. In the case where the tape speed is one half of that in FIG. 1, just one half of each track is successively rewritten by the head 1 or 3 as shown in FIG. 2, thus forming recording tracks 2'a, 4'b, 2'b, 4'c and so on one half in width. This recording process is hereinafter called "the superimposed writting". Especially in the home video tape recorders now in use, no guard band is provided between the adjacent tracks in order to improve the recording density and instead, the gap angles or azimuth angle of the heads 1 and 3 with respect to the recording tracks are differentiated, thus preventing crosstalk from the adjacent tracks recorded by different heads, by use of the reproduction loss due to the difference of gap angles of the heads. For this reason, even when a recording track narrower than the heads is formed by the "superimposed writing" and the recorded data are read by a head wider than the track, crosstalk is reduced to a practically satisfactory degree.

A typical example of the rotation control system for the rotary head performing such a recording/reproduction is shown in FIG. 3, and a waveforms for explaining the operation thereof in FIG. 4. This control system is shown, for example, a book entitled "VTR" by Kenichi Sawazaki published by Corona Co., Ltd. Japan, pp. 141-143, 150-152. A synchronizing signal is separated from the video signal by a well known circuit not shown, thus providing a vertical synchronizing signal 11 as shown in FIG. 4a which is applied to a terminal 10. This vertical synchronizing signal is applied to a frequency divider 12 comprised of, for example, a monostable multivibrator, whereby it is divided by one half in frequency and produced as an output signal 13 shown in FIG. 4b. This output signal 13 is processed as required through a recording amplifier 14, applied to a control head 15, and recorded on the control track of the magnetic tape in the form of a control pulse 9 synchronized with the leading edge of the output signal 13 as shown in FIG. 4c.

The output signal 13 of the frequency divider 12 is also applied to one of the input terminals of a phase comparator circuit 16 of a rotary drum servo system 26. This drum servo system 26 so functions that the rotational phase of video heads 18a and 18b on a rotary drum 17 is synchronized with the phase of the output signal 13. In other words, the rotational phase of the rotary drum 17 is detected by a rotational phase detector means 191, and the detected signal is transformed into a rotational phase signal 20 as shown in FIG. 4d by a waveform shaping circuit 192, which signal is applied to the other input terminal of the phase comparator circuit 16. The output signal of the phase comparator circuit 16 is applied to a motor drive amplifier 21, so that the rotational phase of a motor 22 is controlled, thus driving the rotary drum 17 in synchronism with the vertical synchronizing signal. In this way, each field of video signal is recorded by being allotted exactly on each recording track as shown in FIG. 1 or FIG. 2.

In case of reproduction, the control pulse 9s is read from the control track of the magnetic tape by the control head 15, and the control pulse thus read is applied to the one input terminal of the phase comparator circuit 16 in place of the output signal 13 of the frequency divider 12 through a path not shown in the FIG. 3. The phase comparator circuit 16 compares the phase of the control pulse thus read with that of the rotational phase signal 20 produced in synchronism with the rotation of the rotary drum 17, thus controlling the rotary drum 17 to rotate in synchronism with the control pulse. As a result, the video heads 18a and 18b are capable of tracing accurately the same tracks as the recording tracks.

This operation is performed in the same manner for long play mode as for standard play mode, although the long play mode has a problem as mentioned below.

In the long play mode, a recording track one half the width of the heads is formed as previously described. In view of the fact that the heads perform the same tracing operation in reproduction as in recording, however, the head 1' for reproducing the track 2'x, for instance, traces the same position as the head 1 in recording operation. Thus the center line 5 of the head 1 is displaced from the center line 6 of the recording track 2'x as shown in the FIG. 2, with the result that the signal is read only by one end portion of the head 1'. If jitter occurs in the running speed of the magnetic tape, the head 1' may displace slightly to the right in FIG. 2 thus causing the head 1' in reproduction to fail to cover the entire width of the recording head 2'x, resulting in a mistracking. Especially in the case where reproduction is performed by another video tape recorder different from that used for recording and the head used for reproduction has a smaller width than the head used for recording, part of the recording track always fails to be traced. In such a case, even a slight jitter of the running speed of the tape causes the tracing of the reproduction head to be displaced completely from the recording track to be traced.

To prevent such a problem, the tracking by the reproduction head is required to be adjusted manually before reproduction, thus complicating the procedures for operation of the video tape recorder.

SUMMARY OF THE INVENTION

An object of the present invention is to provide a servo circuit for the rotary heads of a video tape recorder in which even in the case of effecting the superimposed recording with the tape feed rate lower than the standard rate for recording or in the case of jittering of the running tape speed, no mistracking occurs at the time of reproduction and which requires no manual tracking adjustment.

In order to achieve the above-mentioned object, the present invention is characterized in that the control pulse for causing the video head to accurately trace the recording track at the time of reproduction is recorded with the phase thereof adapts to be switched in accordance with the tape feed rate. By doing so, in the event that the recording track is narrowed by the superimposed recording at a lower tape feed rate so that the center of the recording track fails to coincide with the center the recording head, the phase of the control pulse is displaced in phase in such a manner that the rotational phase of the rotary head at the time of recording is different from that at the time of reproduction, with the result that the center of the reproduction head automatically coincides with the center of the recording track at the time of reproduction. This eliminates the need for manual adjusting of tracking at the time of reproduction. Further, in view of the fact that the reproduction head is wider than the recording track and their centers coincide with each other in tracing, the recording head is prevented from being displaced from the recording track in spite of some jittering of the running tape speed.

BRIEF DESCRIPTION OF THE DRAWINGS

FIGS. 1 and 2 are diagrams illustratively showing a pattern of the recording track for the video signal recorded on a magnetic tape, in which FIG. 1 shows the case lacking a guard band between adjacent tracks, and FIG. 2 the case in which the tape feed rate is one half that of FIG. 1.

DESCRIPTION OF THE PREFERRED EMBODIMENTS

Figure 5:
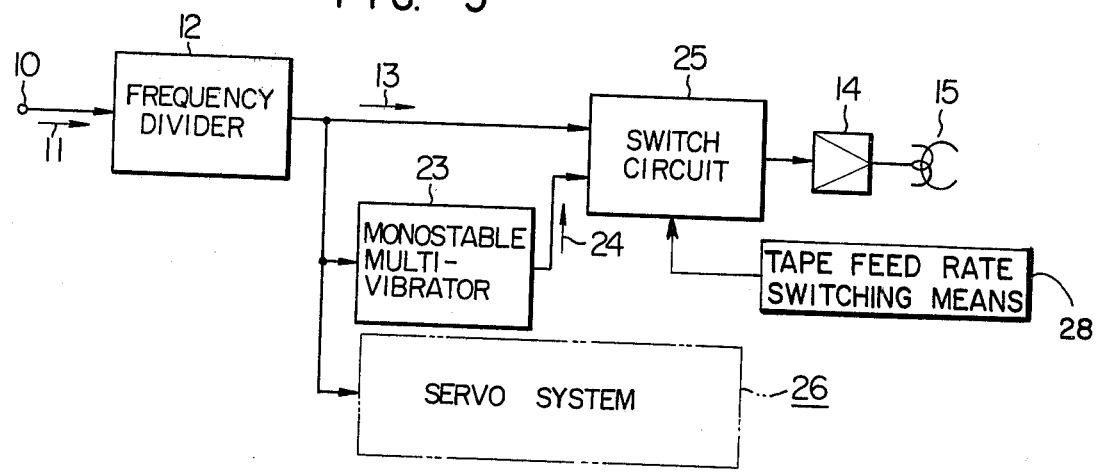
FIG. 5 is a block diagram showing the essential parts of an embodiment of the servo circuit of the rotary head according to the present invention.
Figure 6:
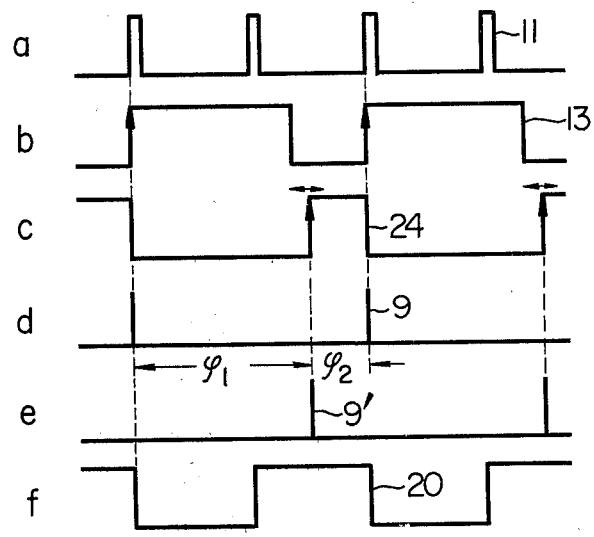
FIG. 6a-f shows signal waveforms at the essential parts for explaining the operation of the circuit shown in FIG. 5.

A block diagram of the servo circuit for the rotary heads according to the present invention is shown in FIG. 5, and signal waveform produced at the essential parts of the circuit in FIG. 6.

Figure 3:
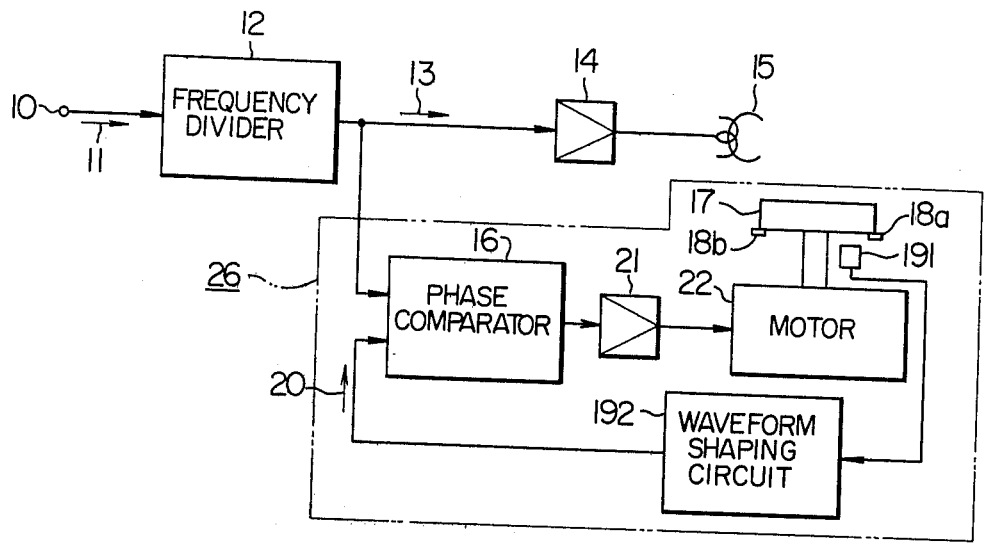
FIG. 3 is a block diagram showing a conventional servo system for the rotary head.
Figure 4:
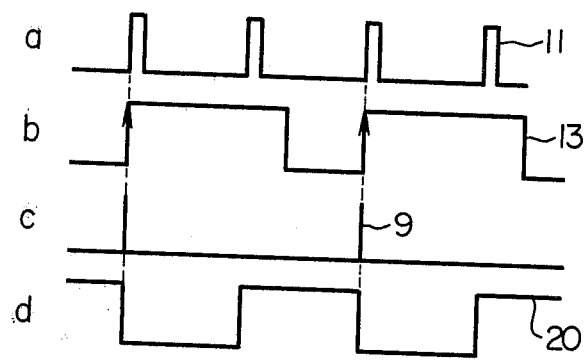
FIG. 4a-d is a waveform diagram for explaining the operation of the circuit shown in FIG. 3.

The reference numerals are the same as those of FIG. 3 which show the same components. A servo system 26 for the rotary drum of FIG. 5 may employ quite the same circuit as the conventional servo system shown in FIG. 3. As in the case of FIG. 3, a vertical synchronizing signal 11 of FIG. 6a applied to a terminal 10 is supplied to a frequency divider 12 thus providing a frequency-divided output signal 13 as shown in FIG. 6b. Numeral 23 shows a delaying monostable multivibrator which is triggered by the leading edge of the frequency-divided output signal 13 to produce a delayed output signal 24 as shown in FIG. 6c. This delayed output signal 24 and the frequency-divided output signal 13 are applied to a switch circuit 25. The switch circuit 25 is operatively interlocked with magnetic tape speed switching means 28 for selecting standard play mode or long play mode for recording/reproduction. When the standard play mode is selected, the frequency divided output signal 13 is selected and passed therethrough, while when the long play mode is selected, the delayed output 24 is passed therethrough, and the selected signal is applied to a recording amplifier 14. At the recording amplifier 14, as in the embodiment shown in FIG. 3, a control pulse 9 or 9' in phase with the leading edge of the frequency-divided output signal 13 or the delayed output 24 (FIG. 6d or FIG. 6e) is produced respectively, applied to a control head 15 and recorded in the control track of the magnetic tape.

Figure 2:
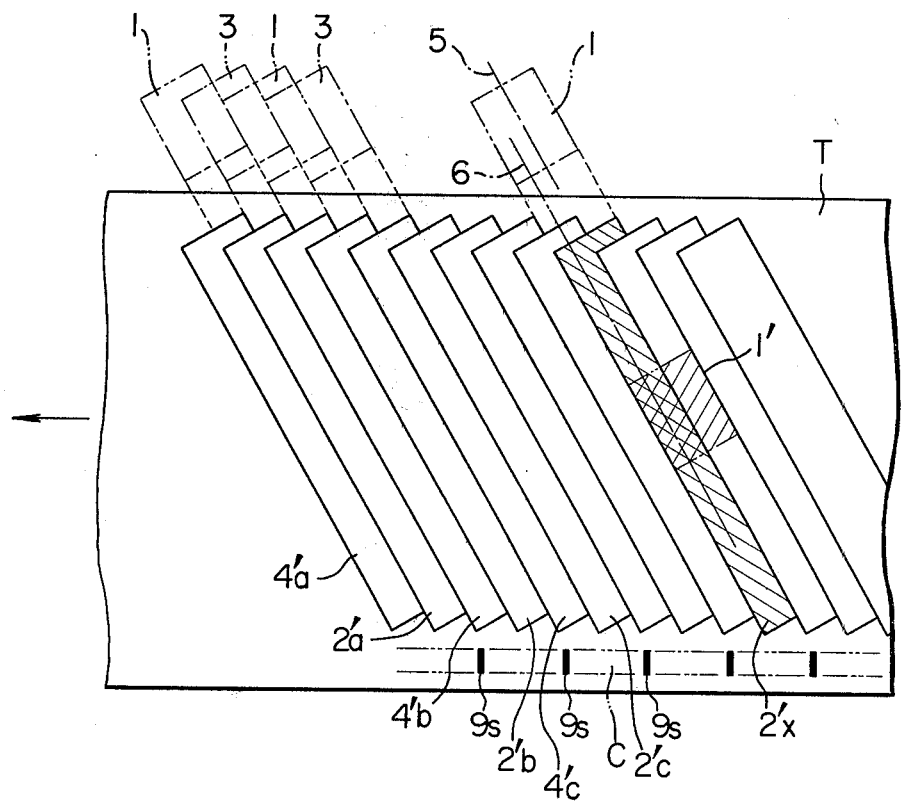
Figure 7:
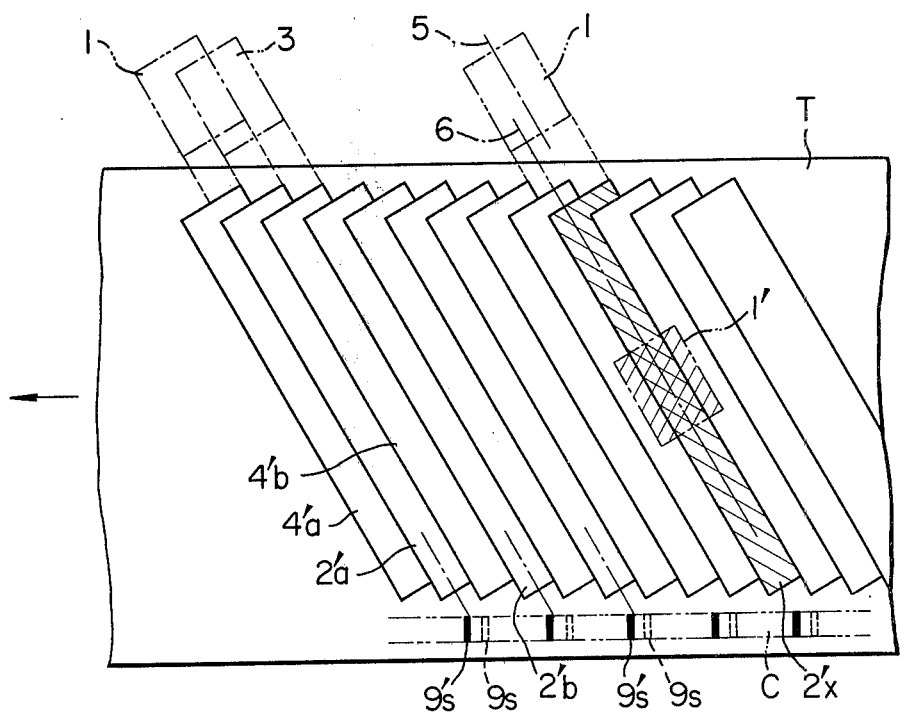
FIG. 7 is a diagram showing a pattern of the signal recorded by the servo system according to the present invention and the relation between reproduction heads and recording tracks at the time of reproduction.
Figure 8:
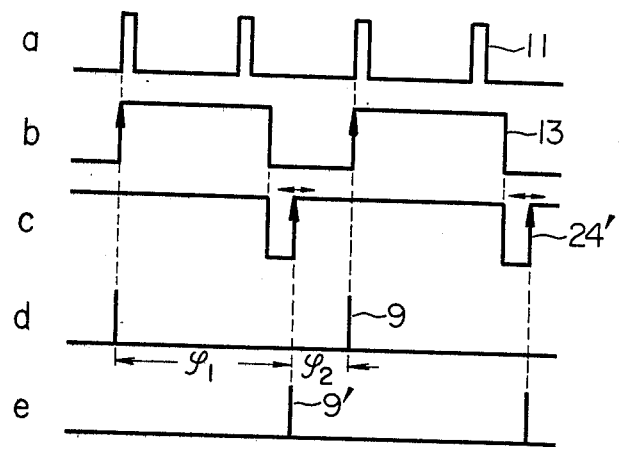
FIG. 8a-e is a waveform diagram for explaining another operation for triggering the monostable multivibrator 23 shown in FIG. 5.

In this circuit, the frequency-divided output signal 13 is applied to the recording amplifier 14 in the standard play mode, and therefore the same operation as in the conventional servo circuit of FIG. 3 is performed. In the long play mode, on the other hand, the delayed output 24 in place of the frequency-divided output signal 13 is applied to the recording amplifier 14. The control pulse 9' produced through the delayed output 24 has a phase delayed of $\phi_1$ behind the control pulse 9 as shown in FIG. 6e. This delayed phase is substantially the same as the phase advanced by $\phi_2$. The phase of this control pulse 9' is compared with that of a rotational phase signal 20 (FIG. 6f), so that the rotary heads for reproduction are driven at a phase advanced from that for recording. This recording operation will be explained with reference to FIG. 7. FIG. 7 shows a pattern similar to the recording track pattern of FIG. 2. In the case of FIG. 7, recording tracks 2'a, 4'a, 2'b, 4'b and so on half the width of the heads 1 and 3 are formed. The pattern of FIG. 7 is different from that of FIG. 2 in that in the case of FIG. 7 the circuit of FIG. 5 causes the control pulse 9's to be recorded at a phase advanced from the position of the control pulse 9s for the conventional system. In other words, the control pulse 9's are recorded not at the tracing center of the head 1 for recording but at positions corresponding to the centers of the recording tracks 2'a, 2'b and so on. Therefore, the center of the tracing position of the head 1' for reproduction fails to coincide with the center line 5 of the head for recording but coincides with the center line 6 of the recording track 2'x as shown in the drawing. As a result, each recording track is provided with a margin on both sides, thereby eliminating the need for manual tracking adjustment at the time of reproduction, resulting in a connected tracking being attained automatically by the circuit of the servo system.

Figure 1:
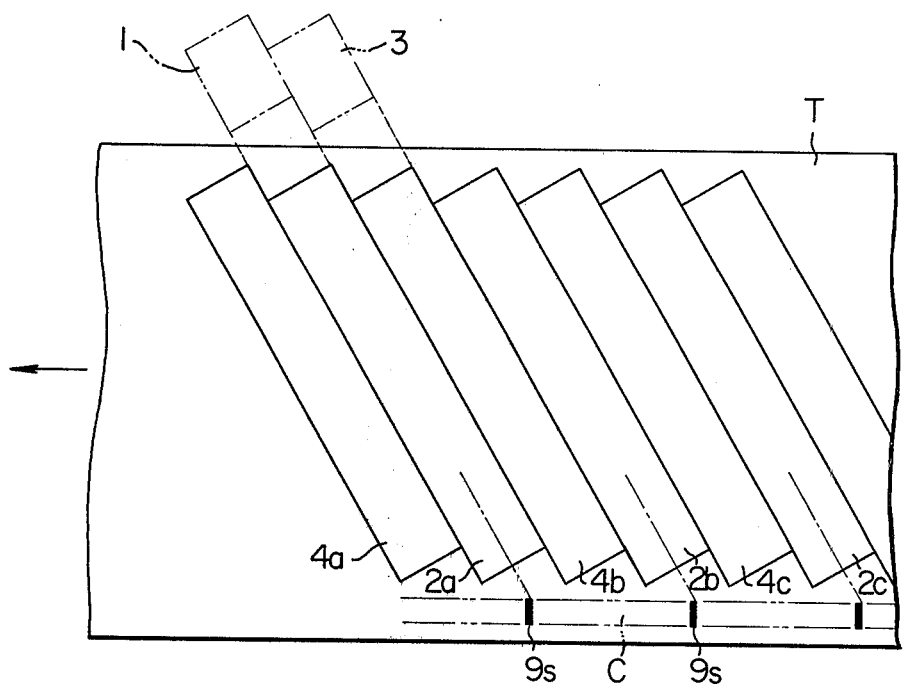

The position of the control pulse 9's shown in FIG. 7 is illustrative for facilitating the understanding and does not represent the actual recording position on magnetic tape. This is also the case with FIGS. 1 and 2. In actual video tape recorders, the position of the rotary heads and that of the control head are considerably spaced along the path of the magnetic tape, and the relative position of the recording track for the video signal with respect to the recording locus of the control pulse is determined in accordance with the spatial difference between the positions of the rotary heads and the control head.

The feature of the present invention lies in that the recording operation is performed by differentiating the phase of the control pulse from that in the standard play mode in the long play mode in which the feed rate of the magnetic tape is lower than the standard speed. As a consequence, at the time of reproduction, the center of the recording track automatically coincides with the center of the head for tracing, and therefore mistracking is avoided even in the presence of magnetic tape jitter. Also, a satisfactory tracking condition is achieved even if there is a difference in head width between recording and reproduction.

In connection with the operation of the embodiment shown in FIG. 5, it was explained that the delaying monostable multivibrator 23 is constructed in such a manner that it is triggered at the leading edge of the frequency-divided output signal 13 shown in FIG. 6b. As an alternative to the multivibrator 23 of FIG. 5, however, the multivibrator 23 may be constructed in such a manner that it is triggered at the trailing edge of the frequency-divided output signal 13 as shown in FIGS. 8a to 8e. Regardless of whether the monostable multivibrator is triggered at the leading edge or trailing edge of the waveform, it is a well known circuit for processing a pulse, and is easily realizable.

Figure 9:
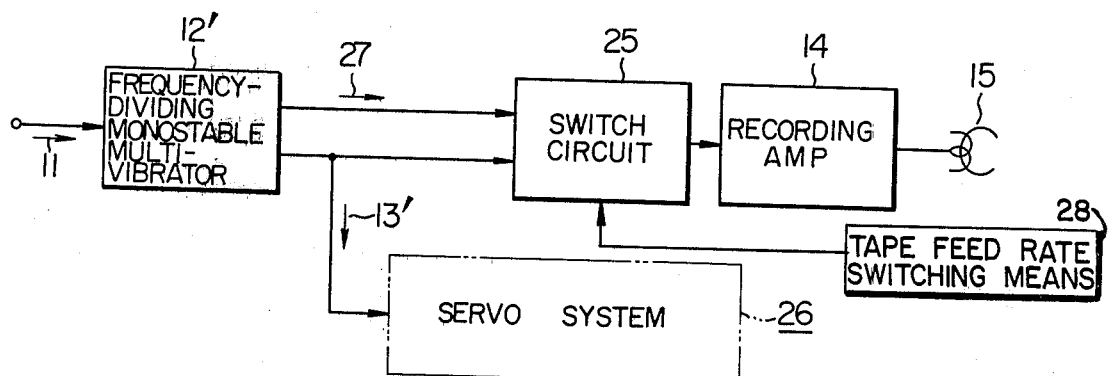
FIG. 9 is a block diagram showing another embodiment of the servo circuit for the rotary heads.
Figure 10:
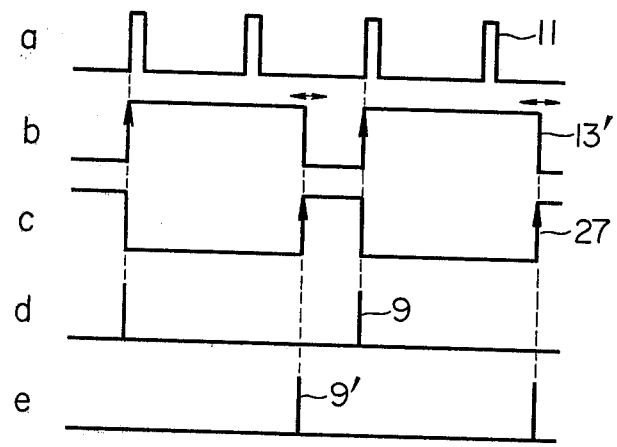
FIG. 10a-e shows waveforms at the essential parts for explaining the operation of the circuit of FIG. 9.

The essential parts of another embodiment of the present invention are shown in FIG. 9, and the waveforms produced at the essential parts of the same circuit are shown in FIG. 10. In this embodiment, a frequency-dividing monostable multivibrator 12' is adapted to produce two output signals of opposite phases, and the amount of phase delay between the two output signals is set at the same amount as the delay $\phi_1$ of the delaying monostable multivibrator 23 used in the embodiment of FIG. 5. In this way, the vertical synchronizing signal 11 (FIG. 10a) as divided into the frequency-divided output signal 13' (FIG. 10b) is produced from one of the output terminals, while a signal 27 of opposite phase is produced at the other output terminal. The frequency-divided output signal 13' is applied to the servo system 26 for the rotary drum on the one hand and to the switch circuit 25 on the other hand. In standard play mode, this frequency-divided output signal is also applied to the recording amplifier 14, thus producing a standard control pulse 9 (FIG. 10d) as in the preceding embodiments. In long play mode, on the other hand, the signal 27 of opposite phase (FIG. 10c) is applied selectively through the switch 25 to the recording amplifier 14, so that the control pulse 9' with the phase thereof shifted with respect to the pulse 9 as shown in FIG. 10e is produced, resulting in quite the same operation as in the preceding embodiment.

We claim:

1. A servo circuit for a video tape recorder which comprises two rotary heads of helical scan type for forming a multiplicity of oblique recording tracks on a magnetic tape, and means for selectively changing over the magnetic tape feed rate with which recording/reproduction is performed between at least two values, each of said recording tracks being formed superimposed partially on the previously-formed recording track on the magnetic tape when the recording is performed with the lower one of the at least two tape feed rates, thereby causing each recording track to be narrower than the width of each of the heads, said servo circuit comprising:

means for generating a first control signal in synchronism with a vertical synchronizing signal extracted from the video signal to be recorded;

means for recording said first control signal on a control track of the magnetic tape;

means for controlling the rotational phase of said rotary heads by the first control signal read from the control track of said magnetic tape at the time of reproduction;

means for generating a second control signal having a phase shifted by predetermined amount from the phase of said first control signal; and means interlocked with said magnetic tape feed rate switching means for recording said second control signal in place of said first control signal when the lower feed rate of said magnetic tape is selected.

2. A servo circuit for the rotary heads according to claim 1, wherein said means for generating said second control signal includes a frequency divider circuit for dividing the frequency of said vertical synchronizing signal by one half, and a delay circuit for delaying the output of said frequency divider circuit.

3. A servo circuit for a video tape recorder which comprises two rotary heads of helical scan type for forming a multiplicity of oblique recording tracks on a magnetic tape, and means for selectively changing over the magnetic tape feed rate with which recording/reproduction is performed between at least two values, each of said recording tracks being formed superimposed partially on the previously-formed recording track on the magnetic tape when the recording is performed with the lower one of the at least two tape feed rates, thereby causing each recording track to be narrower than the width of each of the heads, said servo circuit comprising:

a frequency divider circuit for dividing by one half the frequency of the vertical synchronizing signal extracted from the video signal to be recorded;

means for generating a control pulse in synchronism with the output signal of said frequency divider circuit;

means for recording said control signal on the control track of said magnetic tape;

means for controlling the rotational phase of the rotary heads by said control pulse read from said control track at the time of reproduction;

a delay circuit for delaying the output signal of said frequency divider circuit by a predetermined amount; and switching means for causing said control pulse generator circuit to generate a control pulse in synchronism with the output signal of said delay circuit in place of the output signal of said frequency divider circuit when the lower feed rate of the magnetic tape is selected.

4. A servo circuit for the rotary heads according to claim 3, wherein said delay circuit includes a monostable multivibrator triggered by the trailing edge (negative going edge) of the output signal of said frequency divider circuit.

5. A servo circuit for the rotary heads according to claim 3, wherein said frequency divider circuit includes a monostable multivibrator triggered by said vertical synchronizing signal and reset after a predtermined amount of delay, said switching means including means for applying the output signal of said monostable multivibrator to said control pulse generating/recording means when the higher feed rate of the magnetic tape is selected, and applying the reversed output signal of said monostable multivibrator to said control pulse generating/recording means when the lower feed rate of the magnetic tape is selected.

* * * * *